(12) United States Patent
Kristensen (10) Patent No.: US 8,581,436 B2
(45) Date of Patent: Nov. 12, 2013

(54) OFF-MAINS SWITCH AND A CONTROL BOX FOR ELECTRICALLY DRIVEN ARTICLES OF FURNITURE

(75) Inventor: Henning Kristensen, Sydals (DK)

(73) Assignee: Linak A/S, Nordborg (DK)

( * ) Notice: Subject to any disclaimer, the term of this patent is extended or adjusted under 35 U.S.C. 154(b) by 1247 days.

(21) Appl. No.: 12/225,155

(22) PCT Filed: Mar. 19, 2007

(86) PCT No.: PCT/DK2007/000136
§ 371 (c)(1),
(2), (4) Date: Sep. 16, 2008

(87) PCT Pub. No.: WO2007/107157
PCT Pub. Date: Sep. 27, 2007

(65) Prior Publication Data
US 2009/0267420 A1    Oct. 29, 2009

(30) Foreign Application Priority Data
Mar. 18, 2006    (DK) .................................. 2006 00385

(51) Int. Cl.
*H04B 3/54* (2006.01)
(52) U.S. Cl.
USPC .................................................. 307/1; 307/3
(58) Field of Classification Search
USPC .................................. 307/1–4; 361/171, 172; 340/12.32–12.39
See application file for complete search history.

(56) References Cited

U.S. PATENT DOCUMENTS

| | | | |
|---|---|---|---|
| 5,929,749 A * | 7/1999 | Slonim et al. .............. | 340/12.34 |
| 6,100,607 A * | 8/2000 | Olivieri et al. ................ | 307/125 |
| 6,614,199 B1 | 9/2003 | Bokämper et al. | |

FOREIGN PATENT DOCUMENTS

| | | |
|---|---|---|
| DE | 20105656 | 9/2001 |
| EP | 1363377 | 11/2003 |
| FR | 2644639 | 9/1990 |

OTHER PUBLICATIONS

English Abstract of EP1363377.

\* cited by examiner

*Primary Examiner* — Fritz M Fleming
(74) *Attorney, Agent, or Firm* — Dykema Gossett PLLC (57) ABSTRACT

An off-mains switch (14) and a control box (15) for electrically adjustable articles of furniture, such as beds, chairs or tables, which automatically interrupt the connection to the power supply when the article of furniture is not adjusted, such that this will not constantly be under the mains voltage. These off-main switches require a multi-part cable which is rigid and thick. In the present structure (14, 15) a single two-part cable (13) is sufficient, as the off-mains switch (14) is configured such that the control signals between control unit/control box (15) and the off-mains switch are transmitted through a mains cable (13). A standard cable having two conductors is then sufficient. This means in turn that standard plugs may be used, and thus that the cable (13) may be connected to the power supply via an ordinary plug. Since, hereby, the off-mains switch may appear as a separate unit, production and logistics are facilitated.

17 Claims, 7 Drawing Sheets

OFF-MAINS SWITCH AND A CONTROL BOX FOR ELECTRICALLY DRIVEN ARTICLES OF FURNITURE

BACKGROUND OF THE INVENTION

1. Field of the Invention

The present invention relates to an off-mains switch as well as a control box for an actuator system intended for use in connection with electrically driven articles of furniture.

2. The Prior Art

To avoid the situation that an electrically adjustable and/or driven article of furniture, such as a bed, a chair or a table, is constantly supplied with mains voltage to the local transformer of the article of furniture, so-called off-mains switches have been developed, which automatically interrupt the connection between the mains supply and the local transformer when the article of furniture is not active, i.e. is not adjusted. The interruption may take place by means of a relay, or a unit having a corresponding relay function, located in the off-mains switch.

When the article of furniture is adjusted to perform e.g. a raise function, such as by operation of a functional key on a hand control associated with the article of furniture, or by a separate activation of the off-mains switch via the hand control and/or directly on the off-mains switch, the off-mains switch is activated and establishes the connection to the mains. Such off-mains switches are known from EP 0 615 667 B2 Okin, DE 92 12 599.9 U1 Dewert, EP 0 792 532 B1 LINAK as well as WO 2004/019463 A1 LINAK. Off-mains switches serve inter alia to prevent or at least reduce the presence of electric or magnetic fields, E-fields and H-fields, respectively, in the article of furniture.

The off-mains switch of EP 0 615 667 is based on an actuator system, in which the operational voltage to the actuator is also a control voltage. Activation of the relay relies on the use of an auxiliary voltage source, coupled in parallel with the main power supply, in the form of a capacitor coupled in parallel with the power supply. The capacitor is supported by a battery in the event that the capacitor should lose its charge. In practice, it has been found that both capacitor and battery may run out of power, and therefore the realization of the invention additionally includes a push-button for manual activation of the relay.

In EP 0 792 533, the mains voltage is interrupted by a set of TRIACs instead of a relay. When the system is operated, the TRIACs are activated by an optocoupler which receives power from a high capacity capacitor, which is kept charged by being connected briefly to the mains at regular intervals. This is done via separate control electronics based on a timer. Another solution is based on a small auxiliary capacitor permanently connected to the mains via voltage-restricting means, and with just enough capacity to activate the optocoupler a single time. These, however, are relatively expensive solutions.

In the vast majority of examples, the electrically adjustable article of furniture is equipped with an actuator system, which may be consist of at least one actuator driven by a low volt DC motor, a control box which may comprise a main power supply having a transformer for feeding the motor, a rectifier and a smoothing capacitor, an electrical control unit and finally at least one hand control which may be a wired and/or be a fixed operating panel or a remote control for activating the control unit. The electrical control unit moreover comprises control of the function which the activator may make the article of furniture perform.

The off-mains switch is typically mounted in a plug box which is inserted into an outlet, and the outlet is most often located at an arbitrary distance from the article of furniture. A special cable, hereinafter called intermediate cable or mains cable, is run from the off-mains switch to the article of furniture. This intermediate cable contains a mains cable having two conductors for feeding the main power supply, and optionally an additional conductor for earth connection, as well as at least one additional wire having a conductor for use in the control of the relay in the off-mains switch by means of the control unit, which may result in a strong and inflexible total intermediate cable.

A special cable, like an intermediate cable, is relatively costly per se, and to avoid special connectors, which may also be relatively costly, the cable is firmly mounted in the off-mains switch as well as in the power supply and the control unit. This is not very expedient in terms of handling and shipment. In addition, a standard length of the intermediate cable also has to be used, more or less, irrespective of the customer's needs being a shorter or longer cable.

It may be seen as an object of the invention to provide an off-mains switch as well as a control box for an actuator system intended for use for an adjustable article of furniture, which fully or partly solves one or more of the above problems singly or in any combination.

It may be seen as an object of the invention to provide a structure and a mode of operation for an off-mains switch and a control box, coupled to it, for an actuator system, in which electric and/or magnetic fields at the actuator because of a mains voltage do not exist, and in which it is constantly ensured that energy is present at the actuator for establishing connection of the actuator to the mains voltage.

It may be seen as an object of the invention to provide a structure of an off-mains switch and a control box for an actuator system, where a single cable having two conductors as an intermediate cable will suffice, that is where the intermediate cable exclusively consists of a cable having two conductors and optionally an additional conductor for an optional earth connection.

When the signals between the control unit and the off-mains switch may be transmitted through a mains cable, a separate conductor for transmitting the control signal is not needed, and a standard mains cable having two electrical conductors as an intermediate cable suffices. This means in turn that a standard plug may be used, and thus the cable may be connected to the power supply via an ordinary plug. Since the off-mains switch may hereby appear as a separate unit, production and logistics will be facilitated.

When the control signal applied from the control box to the off-mains switch is used as an indicator of the size of the low energy storage in the control box, a solution is achieved where the off-mains switch and the control box currently exchange information on the size of the energy storage. Hereby, the amount of energy on the low energy storage may be adapted such that enough energy is constantly available for supplying the control signal transmitter—but such that as little energy as possible is transferred to the control box in a passive state.

When the size and/or the frequency of the low voltage and thereby the low energy transfer to the low energy storage are changed only when so needed because of declining strength and/or frequency and/or duration of the control signal, a solution is achieved where it is constantly ensured that there is energy in the control box during "passive mode" for applying a control signal to the off-mains switch, and where it is ensured at the same time that the amount of low energy being transferred is adapted to this purpose.

The invention also relates to an actuator system, which comprises the inventive off-mains switch and control box, the actuator system additionally comprising an actuator with an associated operating unit.

The invention moreover relates to a system of furniture consisting of an actuator system according to the invention, the system of furniture additionally comprising an electrically adjustable article of furniture whose adjustment may be controlled by the actuator.

Additional advantages will appear from the following detailed description.

BRIEF DESCRIPTION OF THE DRAWINGS

The invention will be explained more fully below with reference to the exemplary embodiments shown in the drawings. In the drawings.

DETAILED DESCRIPTION OF THE PREFERRED EMBODIMENTS

The invention will be explained more fully below on the basis of an electrically adjustable mattress frame for beds. However, it will be appreciated that the invention is not restricted to this.

Figure 1:
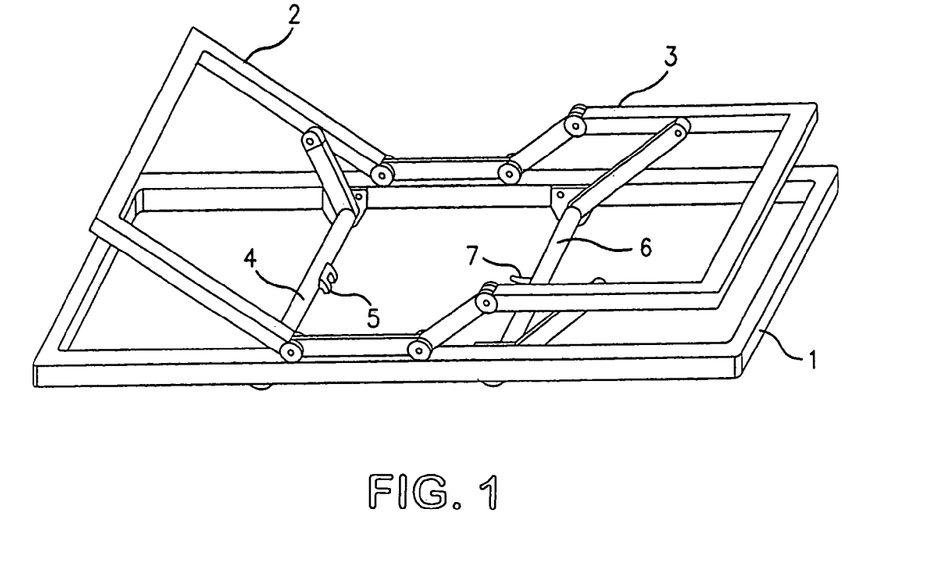
FIG. 1 shows a mattress support shown with raised backrest and legrest sections.

As will appear from FIG. 1, the mattress support comprises a frame 1 in which a backrest section 2 and an articulated legrest section 3 and a firm central section between these are mounted. In the frame, a transverse shaft 4 is mounted for the backrest section 2, said shaft 4 having a short arm 5 secured to it. Correspondingly, a shaft 6 with a short arm 7 is provided for the legrest section 3.

Figure 2:
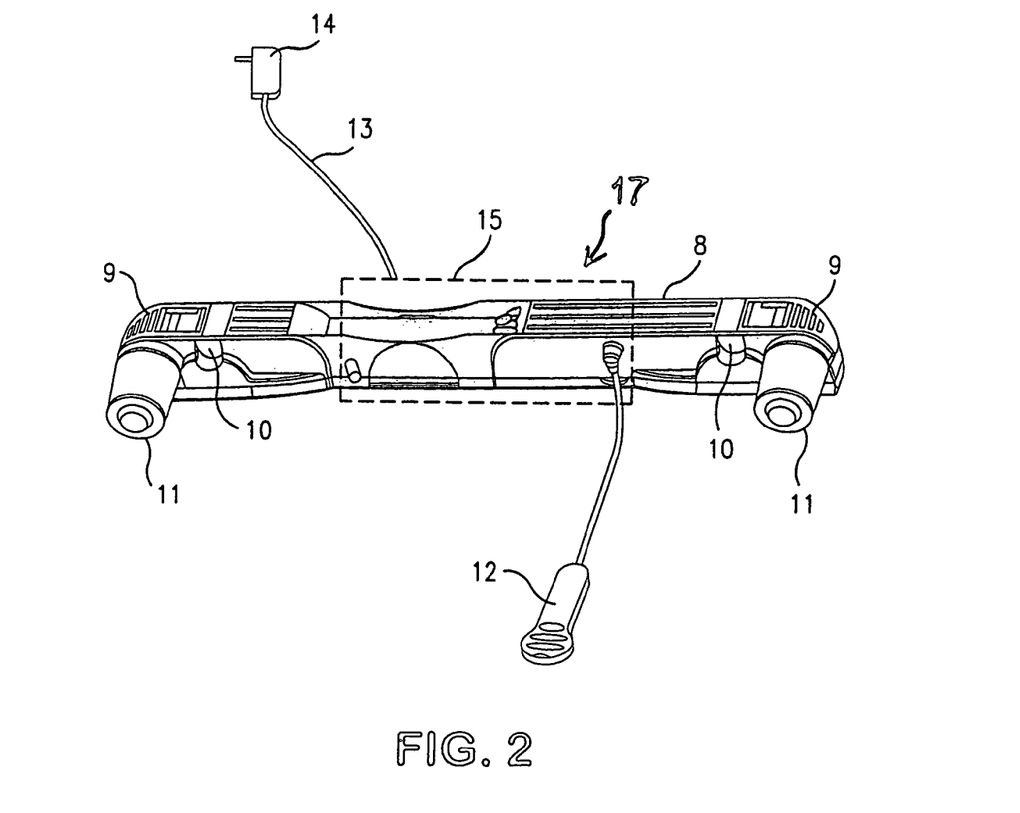
FIG. 2 shows a double actuator.
Figure 3:
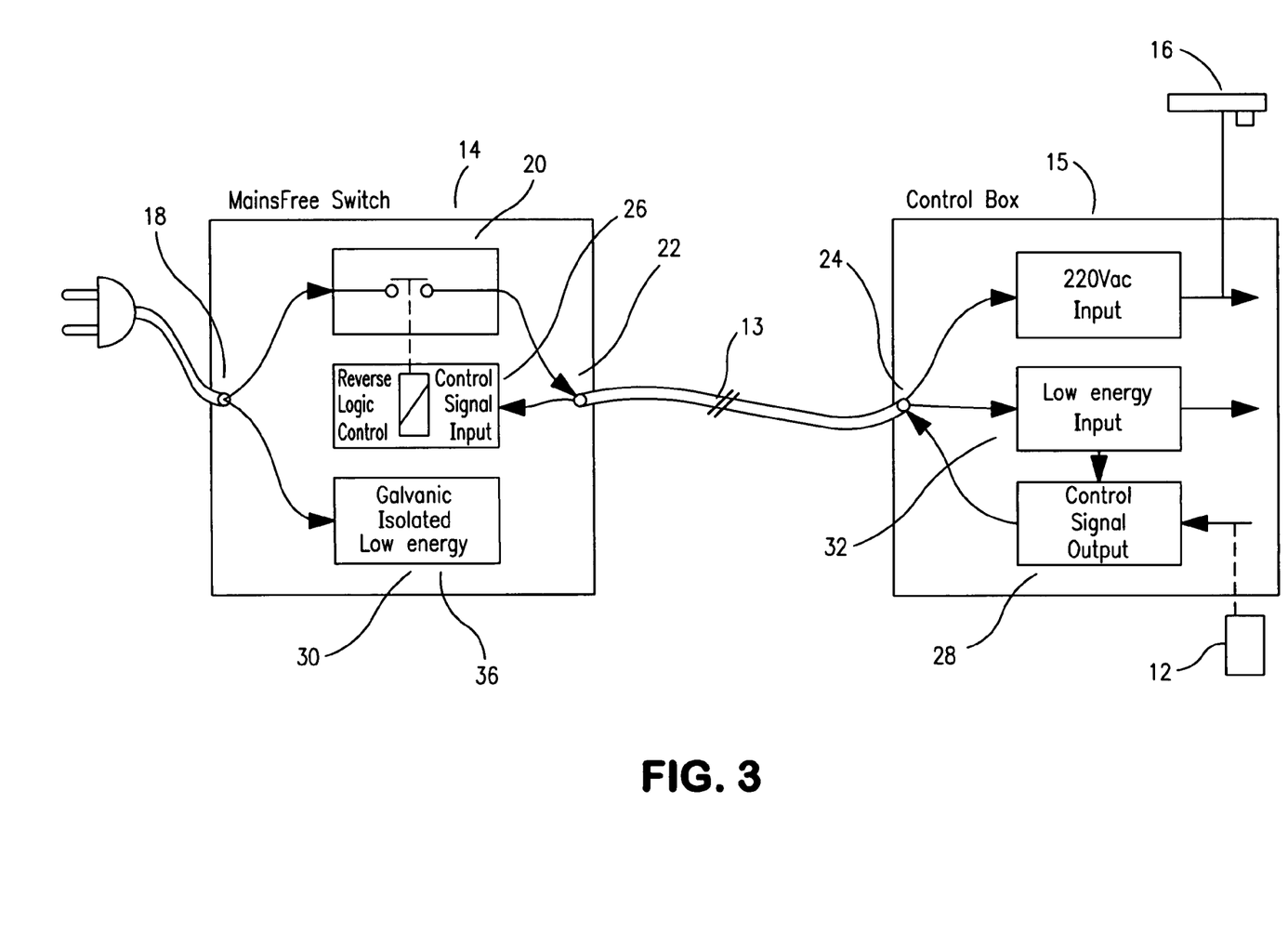
FIG. 3 shows a basic diagram of an off-mains switch and a control box and their mutual connection via an intermediate cable.

The movement of the backrest and legrest sections 2, 3 is brought about by a double actuator 16, as shown in FIG. 2. FIG. 2 shows an actuator system 17 comprising an off-mains switch 14, shown as a box in broken lines, and an intermediate cable 13 which connects the off-mains switch with the control box 15 of the actuator 16. The control box 14 is shown as a box in broken lines. The actuator 16 comprises a cabinet 8 with a cover 9 which is displaceable from the ends and gives access to a transverse opening 10 for the shafts 5, 7. A drive associated with the shaft openings is driven by a low volt DC motor 11, which is provided perpendicularly from the cabinet. The cabinet additionally accommodates a main power supply and an electrical control unit in a control box 15.

The actuator is mounted on the mattress support in that the covers 9 are pulled out, and the actuator is moved upwards until the shafts 5, 7 are engaged with the respective transverse openings 10 and the arms 6, 8 on the shafts are brought into contact with the drives. The covers 9 are closed again, whereby the actuator hangs on the shafts 5, 7. Activation of the drives causes the shafts to rotate, whereby the backrest section and the legrest section, respectively, are raised or lowered.

The actuator is controlled in the example shown by a hand control 12 which is connected by a cable with the control unit 15, also called the control box 15.

The actuator is connected to mains, e.g. 240 volts AC, by an ordinary mains cable 13 having two conductors as an intermediate cable, via an off-mains switch 14, said off-mains switch 14 being mounted in a mains plug box (not shown). The intermediate cable is permanently mounted in the off-mains switch 14, while the other end of the intermediate cable 13 is provided with an ordinary plug (not shown) for insertion into a gate at the side of the cabinet 8, said gate being connected electrically to the control box 15. Alternatively, the plug is intended for insertion into a gate directly in the control box 15. It is an advantage that the mains cable is not permanently mounted in the actuator. As an example, this provides for the handling of the off-mains switch 14, the control box 15 and/or the actuator 11 in separate units, at lower costs than if e.g. special plugs were to be used. Alternatively, the intermediate cable 13 may be equipped with a plug (not shown) at both ends.

As mentioned, the off-mains switch 14 serves to keep the actuator free of mains voltage, when mains voltage is not needed, i.e. in passive mode, and no adjustment of the bed takes place. This is due to the desire of having an actuator and/or article of furniture which is free of mains voltage and H-field (magnetic field strength and E-field (electric field strength), respectively.

The off-mains switch 14 accommodates a relay or relay means 20 (shown and described more fully in FIGS. 3-8), which, controlled by the actuator via the hand control 12, connects mains voltage as needed. A relay 20 is deliberately chosen such that a galvanic separation is established in the off-mains switch as long as the actuator is in a passive mode. When mains voltage is required in the actuator, the galvanic separation is moved down to the mains voltage transformer 34 of the actuator (shown and described more fully in FIGS. 3-8).

The following overall functionalities, as described more fully with reference to FIGS. 3-8, are provided in the off-mains switch:

The control signal from the control box 15 is transferred via the mains voltage lines 13 as well as the actual mains voltage. This saves two signal lines, and the cable 13 between the off-mains switch 14 and the actuator 11 becomes thinner and more flexible. Alternatively, a signal line is saved. The number of conductors saved depends on the principle of transfer which is being compared. The principle of transfer concerns the transfer of a control signal for the control of the relay 20 in the off-mains switch 14. Finally, the number of conductors saved also depends on whether additional separate conductors are used for the transfer of low energy.

Low energy transfer through the mains voltage cable 13 is likewise established. In this respect, the transferred low energy supply in the control box 15 of the actuator is separated from the main voltage supply 15 to counteract depletion of a battery 35, if any, and/or another local energy supply, such as in a capacitor in the actuator.

Figure 4:
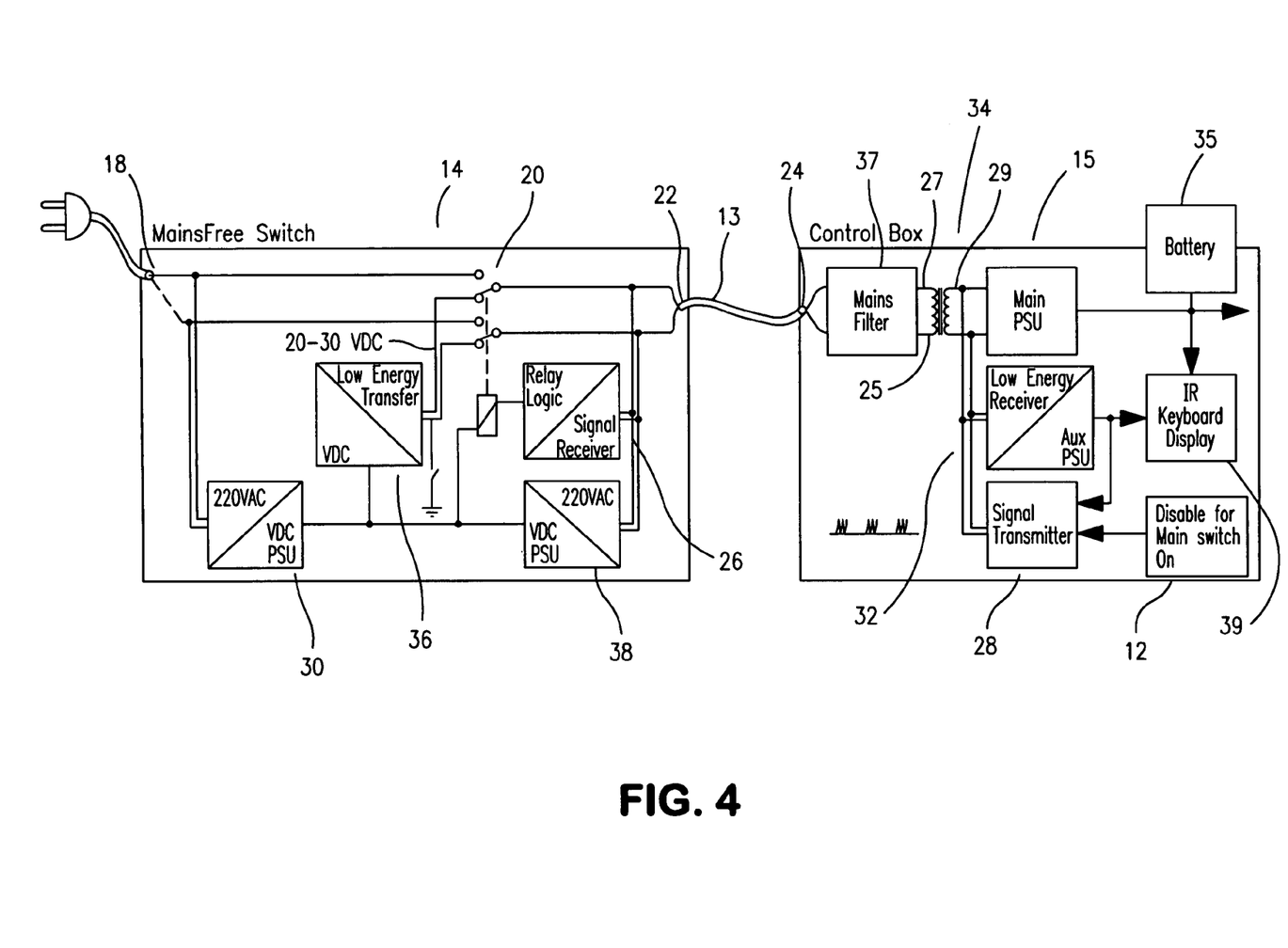
FIG. 4 shows a complete functional block diagram of the off-mains switch and the control box.

FIG. 4 shows a more complete block diagram for the provision of the desired functions. Few functional blocks will necessarily be present in the actuator.

The following functions are included in the block diagram of the off-mains switch:

220 VAC/VDC GPSU: Galvanically separate mains voltage for DC conversion 30

VDC/Low energy transmitter 36: Transfers low energy to the actuator via the intermediate cable 13, the mains filter 37 and the transformer 34 (elements 30, 36 constitute a low voltage source)

Relay 20: Connection and disconnection of mains voltage to the control box 15 of the actuator and thereby the actuator 11

Signal receiver/relay logic 26: Control signal identification and relay control

220 VAC/VDC PSU 38: Not galvanically separated mains voltage for DC conversion.

The following functions are included in the block diagram of the actuator:

Mains filter 37 Mains filter 37 of the actuator

Mains transformer 34 Mains transformer 34 of the actuator (external load)

Main PSU Voltage supply of the actuator and processing of the output signal of the transformer Low energy receiver 32 Receives low energy from the off-mains switch 14 and provides watch functions 39

Signal transmitter 28 Control signal generator/transmitter controlled by watch functions/µP Battery 35 Battery may be connected IR, keyboard, display 39 Watch functions to be "called" by user operating unit 12.

Control Signal Transfer

Figure 5:
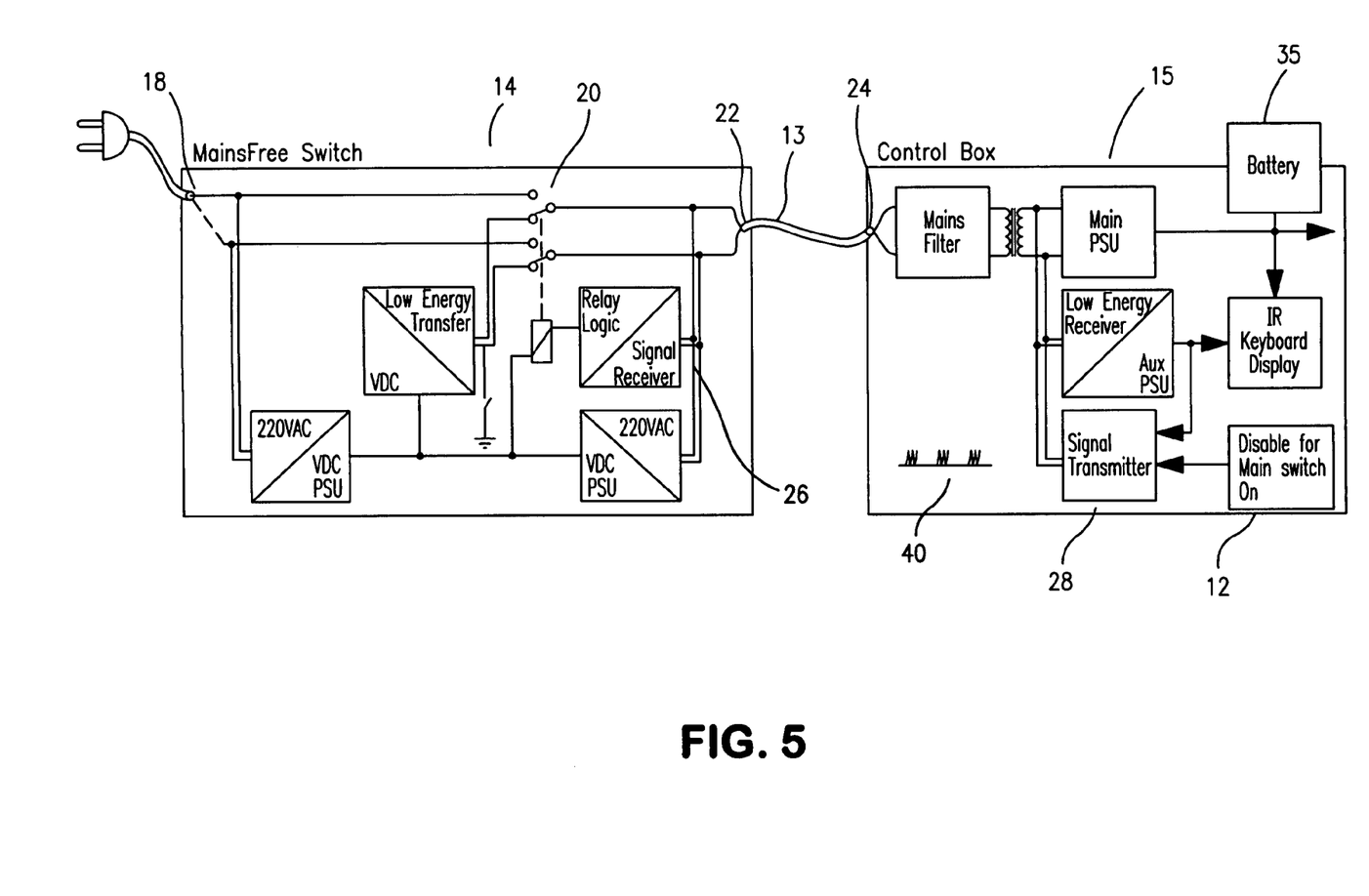
FIG. 5 shows a signal transfer block diagram.

In FIG. 5, the block functions for control signal exchange are highlighted, which are: signal transmitter 28, signal receiver 26/relay logic 26 and relay 20. These functional blocks will be described more fully below.

Signal Transmitter 28

This functional block is supplied with voltage by either the low energy receiver 32 (described more fully in FIG. 5)/Aux PSU or by the main PSU-battery 35 functional blocks. The signal transmitter 28 is controlled passively/actively via a control input and will default be active as long as mains voltage is not needed.

When, via the hand control 12, the user requires mains voltage for motor operation, the transmission of the control signal is stopped, which results in a subsequent activation of the relay 20 in the off-mains switch 14.

The control signal may be realized as a mean frequency burst signal 40. Burst to save energy, and mean frequency for it to be arranged as far away as possible from motor generated harmonics.

Mean frequency means a signal having a given frequency between 50 and 200 kHz, more particularly a signal having a frequency between 100 and 150 kHz, more particularly a signal having a frequency between 120 and 140 kHz.

To avoid any problems of noise, it may be expedient to adjust the size and the duration of the individual bursts 40. For example, a burst with a power pulse of a size of 10-30 milliamperes and a duration of 90-110 microseconds may be expedient.

Signal Receiver 26/Relay Logic

This functional block is supplied with voltage by the 220 VAC/VDC GPSU functional block 30 ("galvanically" separated PSU 30) and detects the control signal from the signal transmitter. As long as the control signal in the form of a burst 40 is repeated periodically, the relay 20 is not drawn. When the burst control signal is absent sufficiently long, the relay 20 is drawn and mains voltage is supplied to the control box 15 of the actuator and thereby the actuator 16 and a motor 11. There will be a delay from the absence of the control signal from the actuator and until the relay activation, which is determined by a number of absent bursts. This is done to prevent the situation to a reasonable degree that failed burst detections cause untimely activation of the relay 20.

Relay 20

Figure 8:
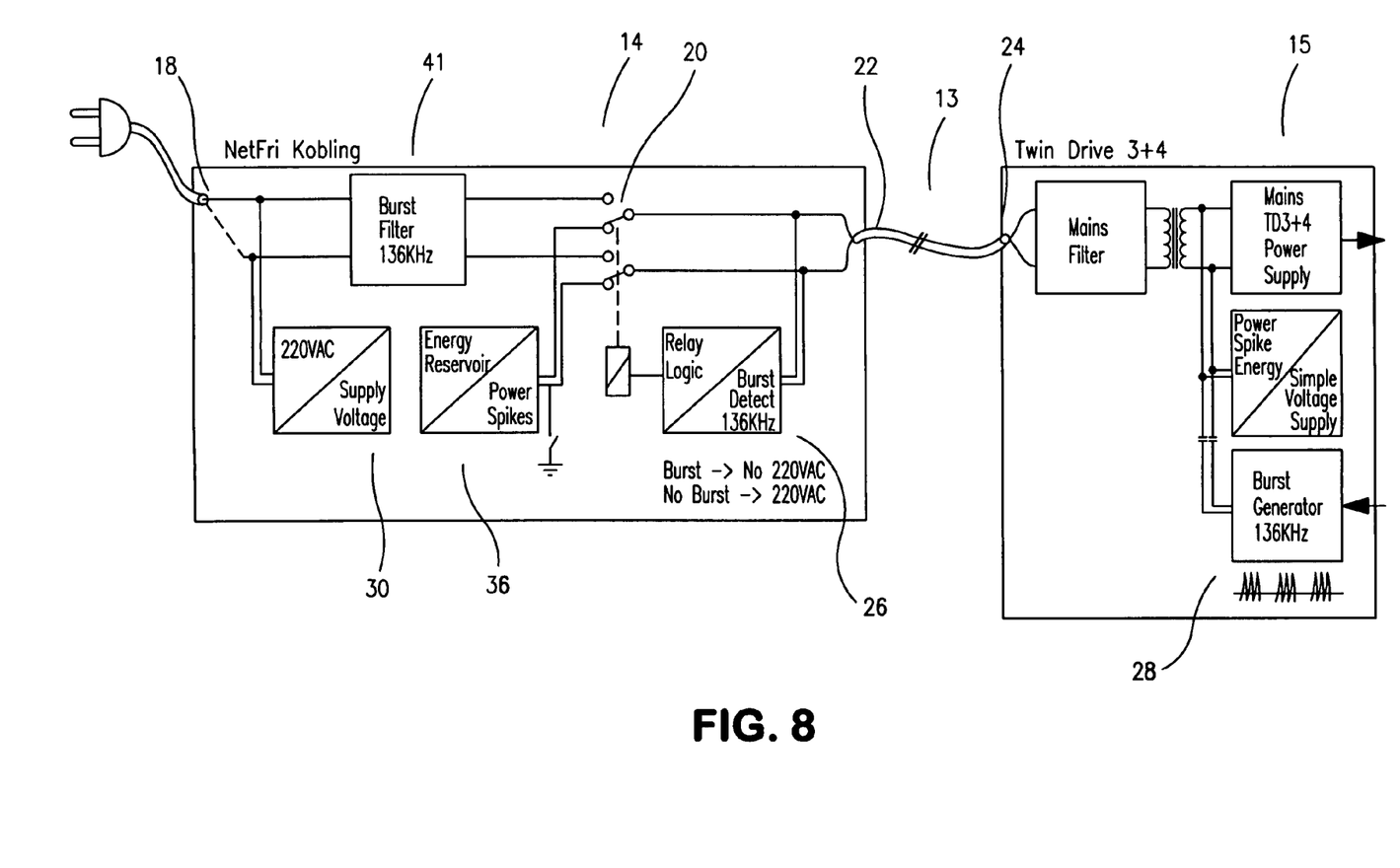
FIG. 8 shows a further embodiment in accordance with the invention.

The relay 20 connects and disconnects mains voltage to the control box 15 of the actuator and thereby to the actuator controlled by the signal receiver 26/relay logic functional block. In the first instance, the relay 20 is supplied with voltage by the 220 VAC/VDC GPSU 30 functional block ("galvanically" separated PSU), which just has a limited energy supply. As soon as the relay has switched the switches, the relay is supplied with voltage by the 220 VAC/VDC PSU 38 functional block ("not galvanically" separated PSU) with a greater energy capacity in the form of both a higher voltage and power. This principle may be abandoned, and it is shown in FIG. 8 that the PSU 38 may be omitted.

Low Energy Transfer

Figure 6:
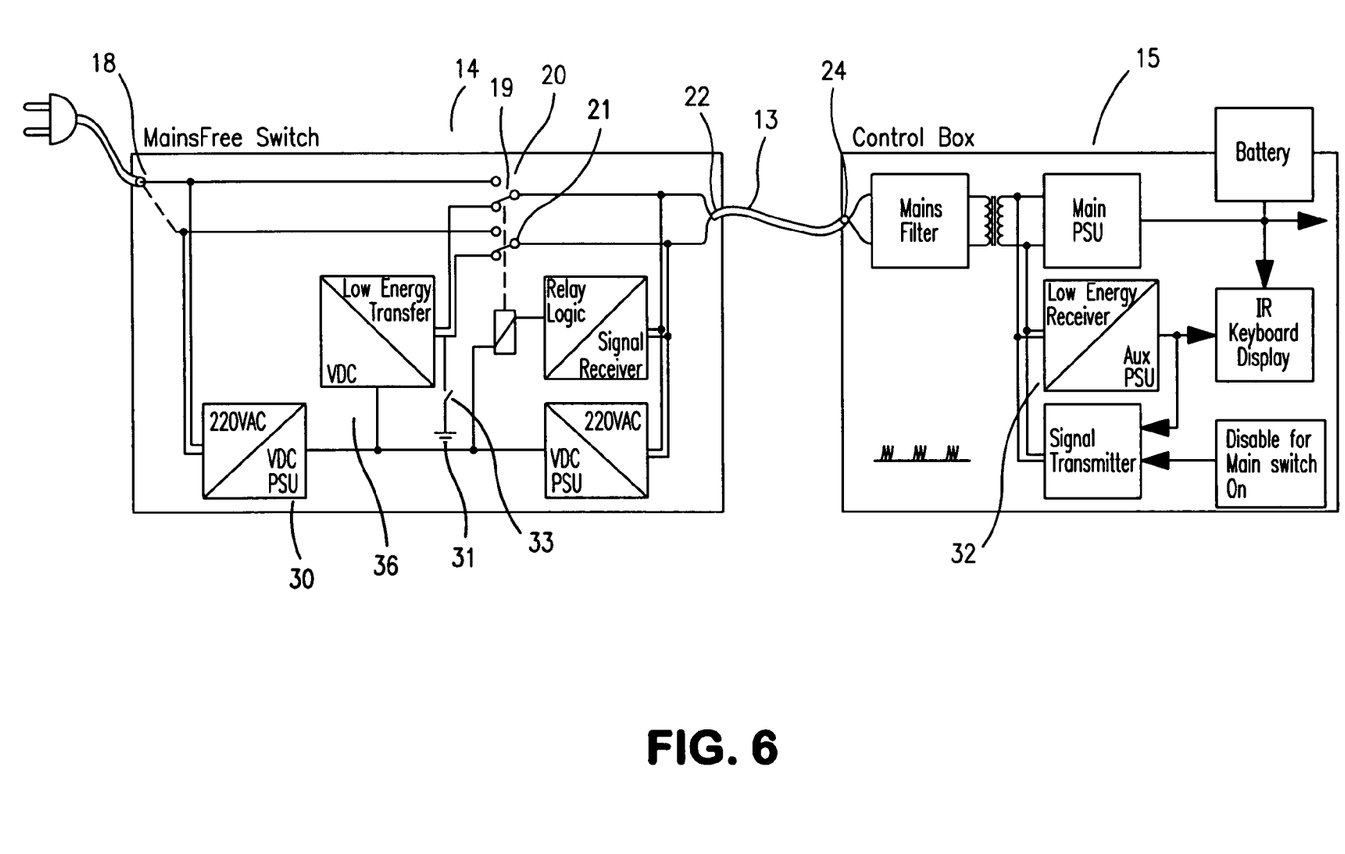
FIG. 6 shows a low energy transfer block diagram.

The block functions of low energy transfer are highlighted in FIG. 6, which are: VDC/low energy transmitter 36 and low energy receiver/Aux PSU.

FIG. 6 VDC/Low Energy Transmitter

The functional block receives its energy supply from the 220VAC/VDC GPSU 30 functional block ("galvanically" separated PSU). This PSU 30 provides voltage supply for the low energy transfer, which causes strong voltage fluctuations on the voltage supply during the transfer.

A voltage supply of e.g. 20-30 VDC is supplied through the one set of contacts 19 on the relay via the mains filter to the pole of the one primary winding of the mains transformer in the actuator. Earth connection 31 is effected at intervals through the other set of contacts 21 via the mains filter 37 to the pole 25 of the other primary winding of the mains transformer 34 in the actuator. The earth connection may take place via a switch, a transistor or the like shown at 33 and arranged between the earth connection 31 and the other set of contacts 21.

The duration of the short earth connections is determined by the PSU energy supply and the power of the primary winding of the mains transformer. These conditions are predominantly physically decided.

Through the short earth connections, energy is supplied to the core of the mains transformer, which may be drawn on the secondary winding 29.

FIG. 6 Low Energy Receiver 32/Aux PSU

This functional block rectifies the voltage increases of the secondary winding and gradually builds up a voltage which is used as a supply voltage to the signal transmitter and the watch functions 39: IR, keyboard, display. The energy supply of the Aux PSU is low and may thus not be loaded very hard. Therefore, the signal transmitter 28 decides to send bursts instead of a permanent signal.

Variable Earth Connection Frequency

Realizing that the low energy transfer still causes H- and E-fields, although low, in the control box, a frequency adjustment of the low energy is implemented in order to minimize the fields:

When the low energy receiver/Aux PSU supply voltage declines, the burst blocks of the control signal will be spaced more in time, which is to cause the VDC/low energy transmitter 28 to increase the frequency of earth connections 31 and thereby to increase the amount of energy which is transferred. Typically, the interval between the individual earth connections is of the order of half a second (0.5 sec) to one second (1 sec) and the duration e.g. about 10 milliseconds.

When the low energy receiver 32/Aux PSU voltage supply increases, the burst blocks of the control signal will be spaced less in time, which is to cause the VDC/low energy transmitter 36 to reduce the frequency of earth connections 31.

Thus, the minimum required energy transfer may be achieved, which leads to lowest possible H- and E-fields in the transformer and circuits of the control box and thereby the actuator, respectively.

The advantages of the off-mains switch 14 may briefly be summarized as follows:

Only two conductors in the mains cable 13. In particular, there are only two conductors, in the mains cable 13 (also called the intermediate cable 13 herein) for the transfer of both the control signal to the relay 20, low energy transfer, and for the transfer of the mains voltage. In some cases, there may be an additional conductor (not shown) for the transfer of an earth (not shown).

Galvanically separated mains voltage from the actuator. In particular, the mains voltage is galvanically separated from the actuator when the actuator is in a passive mode.

No mains voltage or H- and E-fields when the actuator is in a passive mode. In particular, there is no mains voltage or H- and E-fields, said fields being caused by a mains voltage having a mains frequency when the actuator is in a passive mode.

Inverted control of the relay means 20, so that no signal gives mains voltage, and signal gives no mains voltage.

Galvanically separated low energy is transferred in parallel with relay contact to the actuator.

The relay 20 does not click when low energy is transferred to the actuator. The reason is that the low energy transfer does not take place as a consequence of the relay 20 for the supply of the mains voltage being connected and disconnected for this purpose. On the other hand, in the periodic earth connection of the low energy or more particularly the low voltage, where the low energy has a significantly lower power and voltage, a smaller switch 33 is used, e.g. a transistor 33. The low energy supply is typically of the order of 20-30 VDC. Because of the smaller power and voltage, a much less audible switch 33 may be used, such as a transistor 33, for this purpose.

Figure 7:
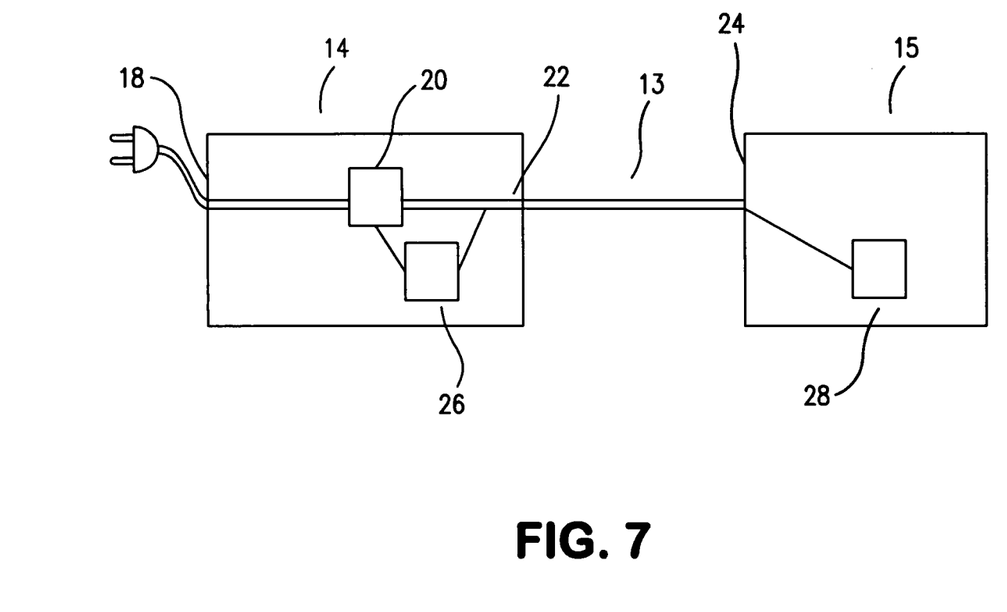
FIG. 7 shows an embodiment in accordance with the invention.

FIG. 7 describes an embodiment in accordance with the invention. The figure shows an off-mains switch 14 intended for off-mains switchable actuators for electrically adjustable articles of furniture (not shown in the figure). The off-mains switch 14 comprises an off-mains switch energy input 18 which may be connected to a mains voltage outlet for supplying the off-mains switch energy input 18 with a mains voltage, an off-mains energy output 22 intended as an output for mains voltage, a relay means 20 positioned in an electrical connection path between the off-mains energy input 18 and the off-mains energy output 22, and a control signal receiver 26 intended to control the relay means 20 on the basis of the control signal, said off-mains switch energy output 22 being additionally adapted to receive the control signal and pass on the control signal to the control signal receiver 26.

FIG. 7 shows moreover the control box 15 intended for off-mains switchable actuators for electrically adjustable articles of furniture, said control box 15 comprising a control box energy input 24 and a control signal generator, also called a signal transmitter 28, for applying a control signal for the control of energy to the control box energy input 24, said control box energy input 24 being adapted to apply the control signal from the control signal generator 28.

The designations and reference numerals used for FIG. 7 are also applicable and used for FIGS. 3-6 and 8.

FIG. 8 shows an embodiment in accordance with the invention. In the embodiment shown, the off-mains switch 14 is not provided with the PSU 38, as shown e.g. in FIG. 4. FIG. 8 moreover shows that the off-mains switch additionally comprises a control signal filter 41, connected electrically such that the control signals are fully or partly prevented from getting into the mains.

The invention has been explained above in connection with an actuator having a drive at each end, where the electrical equipment is incorporated in the actuator. It will be appreciated that the invention may also be used in the cases where the electrical equipment is gathered in a separate control box, which may be divided into two boxes, one for the power supply and one for the control, alternatively control may be incorporated in the actuator. It will likewise be appreciated that the invention may also be used in connection with single actuators of the type defined in WO 02/29284 A1. The invention may also find application in chairs and beds equipped with an electrically driven massage system, as disclosed e.g. in WO 03/094822 A1.

The invention claimed is:

1. An actuator system for articles of furniture, said actuator system comprising an actuator, a control box, an operating unit and an off-mains switch, said off-mains switch comprising:
   an energy input for connection to a mains voltage outlet for supply of a mains voltage,
   an energy output for mains voltage,
   a relay means in an electrical connection path between the off-mains switch energy input and the off-mains switch energy output,
   means for providing a control signal,
   a control signal receiver for controlling the relay means based on the control signal,
   a low voltage source,
   wherein the off-mains switch energy output receives the control signal and forwards the control signal to the control signal receiver,
   wherein the off-mains switch transfers energy from the low voltage source via an external load connected to the off-mains switch energy output,
   wherein the off-mains switch includes an external mains transformer with a primary winding, a first pole and a second pole of the primary winding being connected to a first conductor and a second conductor, respectively, on the off-mains switch energy output, and
   wherein the off-mains switch supplies a low energy supply voltage to the first pole through a first connected set of contacts and performs brief periodic coupling to an earth connection through a second connected set of contacts on the relay means.

2. The actuator system according to claim 1, wherein the off-mains switch energy output is an output having only two electrical conductors.

3. The actuator system according to claim 1, wherein the off-mains switch controls the relay means based on the control signal so as to achieve inverted control of the relay means, such that absence of the control signal gives mains voltage on the off-mains energy output, and the control signal gives interruption of mains voltage for the off-mains switch energy output.

4. The actuator system according to claim 1, wherein the off-mains switch controls the relay means based on the control signal, so that the relay means remains in one position as long as the control signal is received, and is changed to another position when no control signal is received.

5. The actuator system according to claim 1, wherein the off-mains switch transfers low voltage via the off-mains switch energy output when the relay means is in one or two relay means positions.

6. The actuator system according to claim 1, wherein a frequency of the brief periodic earth connections is determined by an energy supply and the power of the primary winding of the mains transformer.

7. The actuator system according to claim 1, wherein a voltage increase of a secondary winding of the external mains transformer is rectified and used for gradually building-up a supply voltage which is used for generating the control signal.

8. The actuator system according to claim 1, wherein the off-mains switch additionally contains a connection means, and wherein the periodic connection takes place with the connection means to thereby avoid using the relay means for the periodic low energy transfer.

9. The actuator system according to claim 1, wherein the low energy source is an AC to DC conversion unit.

10. The actuator system according to claim 1, wherein the control signal is a mean frequency burst signal.

11. The actuator system according to claim 1, wherein the relay means is not drawn as long as the control signal in the form of burst is repeated periodically, and only when the burst control signal is absent sufficiently long is the relay means drawn and mains voltage provided on the off-mains switch energy output.

12. The actuator system according to claim 11, wherein a delay from the absence of the control signal and until activation of the relay means is determined on the basis of a plurality of absent bursts.

13. The actuator system according to claim 1, wherein the off-mains switch additionally comprises a control signal filter connected electrically so that the control signal is fully or partly prevented from entering into the mains.

14. The actuator system according to claim 1, wherein presence of absence of the control signal is used for controlling the relay means for optional transfer of mains voltage via the relay means.

15. The actuator system according to claim 1, wherein at least one of a size, a duration and a frequency of one or more pulses or bursts in the control signal controls an amount and/or a timing of a low energy release from the off-mains switch energy output.

16. The actuator system according to claim 1, wherein only two electrical conductors in the off-mains switch energy output may transfer mains voltage, receive control signals and release low energy.

17. The actuator system according to claim 1, additionally comprising a control box energy input and an intermediate cable for providing a single electrical connection between the off-mains switch energy output and the control box energy input, and wherein the intermediate cable just has two electrical conductors.

* * * * *

UNITED STATES PATENT AND TRADEMARK OFFICE
CERTIFICATE OF CORRECTION

PATENT NO.        : 8,581,436 B2                                      Page 1 of 1
APPLICATION NO. : 12/225155
DATED             : November 12, 2013
INVENTOR(S)       : Henning Kristensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1249 days.

Signed and Sealed this
Twenty-second Day of September, 2015

Michelle K. Lee
*Director of the United States Patent and Trademark Office*